(12) United States Patent
Mickols et al.

(10) Patent No.: US 7,815,987 B2
(45) Date of Patent: Oct. 19, 2010

(54) POLYAMIDE MEMBRANE WITH COATING OF POLYALKYLENE OXIDE AND POLYACRYLAMIDE COMPOUNDS

(75) Inventors: William E. Mickols, Chanhassen, MN (US); Chunming Zhang, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/328,241

(22) Filed: Dec. 4, 2008

(65) Prior Publication Data

US 2010/0143733 A1 Jun. 10, 2010

(51) Int. Cl.
*B32B 27/08* (2006.01)
(52) U.S. Cl. .............. 428/36.5; 428/474.4; 210/500.23; 210/500.33; 210/500.34; 210/500.35; 210/651; 210/652; 210/653; 210/654
(58) Field of Classification Search ................. 428/36.5, 428/474.4; 210/500.23, 500.38, 500.33, 210/500.34, 500.35, 651–654
See application file for complete search history.

(56) References Cited

U.S. PATENT DOCUMENTS

| 4,277,344 | A | 7/1981 | Cadotte |
|---|---|---|---|
| 4,765,897 | A | 8/1988 | Cadotte et al. |
| 4,833,014 | A | 5/1989 | Linder et al. |
| 4,872,984 | A | 10/1989 | Tomaschke |
| 4,888,116 | A | 12/1989 | Cadotte et al. |
| 4,909,943 | A | 3/1990 | Fibiger et al. |
| 4,964,998 | A | 10/1990 | Cadotte et al. |
| 4,981,497 | A | 1/1991 | Hayes |
| 4,983,291 | A | 1/1991 | Chau et al. |
| 5,178,766 | A | 1/1993 | Ikeda et al. |
| 5,614,099 | A | 3/1997 | Hirose et al. |
| 5,658,460 | A | 8/1997 | Cadotte et al. |
| 5,755,964 | A | 5/1998 | Mickols |
| 5,876,602 | A * | 3/1999 | Jons et al. .............. 210/500.38 |
| 6,280,853 | B1 * | 8/2001 | Mickols .................. 428/474.4 |
| 6,878,278 | B2 | 4/2005 | Mickols |
| 6,913,694 | B2 | 7/2005 | Koo et al. |
| 7,279,097 | B2 | 10/2007 | Tomiokoa et al. |
| 7,490,725 | B2 | 2/2009 | Pinnau et al. |
| 7,491,334 | B2 | 2/2009 | Comstock |
| 2005/0056589 | A1 | 3/2005 | Hendel et al. |
| 2005/0077243 | A1 | 4/2005 | Pinnau et al. |
| 2007/0039873 | A1 | 2/2007 | Kurth et al. |
| 2007/0039874 | A1 | 2/2007 | Kniajanski et al. |
| 2007/0175820 | A1 | 8/2007 | Koo et al. |
| 2007/0175821 | A1 | 8/2007 | Ja-Young et al. |
| 2007/0251883 | A1 | 11/2007 | Niu |
| 2008/0000843 | A1 | 1/2008 | Sasaki et al. |
| 2008/0185332 | A1 * | 8/2008 | Niu et al. ............... 210/500.38 |
| 2008/0185532 | A1 | 8/2008 | Niu et al. |
| 2008/0269417 | A1 | 10/2008 | Belfer et al. |
| 2009/0129527 | A1 | 5/2009 | Mickols et al. |
| 2009/0194479 | A1 | 8/2009 | Mickols et al. |
| 2009/0220690 | A1 * | 9/2009 | Niu et al. .................... 427/245 |

FOREIGN PATENT DOCUMENTS

| KR | 1020050074167 | 4/2005 |
|---|---|---|
| WO | WO2006/037321 | 4/2006 |
| WO | WO2007/133362 | 11/2007 |

OTHER PUBLICATIONS

Pinnau, et al , "Effects of polyether-polyamide block copolymer coating on performance and fouling of reverse osmosis membranes," Journal of Membrane Science 280(2006) p. 762-770.

Wo, et al., Modification of aromatic polyamide thin-film composite reverse osmosis membranes by surface coating of thermo-responsive copolymers P(NIPAM-co-Am), Journal of Membrane Science, 352 (2010) p. 76-85.

* cited by examiner

*Primary Examiner*—Leszek Kiliman
(74) *Attorney, Agent, or Firm*—Edward W. Black

(57) ABSTRACT

A polyamide membrane and method for making and using the same, including use within a spiral wound module. While many different embodiments are described, one embodiment includes a polyamide membrane including a coating comprising a combination of a polyalkylene oxide compound and a polyacrylamide compound.

19 Claims, No Drawings

POLYAMIDE MEMBRANE WITH COATING OF POLYALKYLENE OXIDE AND POLYACRYLAMIDE COMPOUNDS

BACKGROUND OF THE INVENTION:

(1) Field of the Invention

The invention generally relates to polyamide membranes including methods for preparing and modifying such membranes, such as by way of the application of modifiers, coatings and the like. The invention further relates to spiral wound modules incorporating polyamide membranes.

(2) Description of the Related Art

Polyamide membranes are commonly used in a variety of fluid separations. One class of such membranes are composite membranes which may comprise a microporous support with a "thin film" or "discriminating" polyamide layer as described in U.S. Pat. No. 4,277,344 to Cadotte et al. The properties of such membranes may be modified by the addition of various additives, coatings and post-treatments as described in: U.S. Pat. Nos. 4,765,897, 4,888,116, 4,964,998 and 5,658,460 to Cadotte et. al., U.S. Pat. No. 4,872,984 to Tomaschke, U.S. Pat. No. 4,833,014 to Linder et al., U.S. Pat. No. 4,909,943 to Fibiger et al., U.S. Pat. No. 4,983,291 to Chau et al., U.S. Pat. No. 5,178,766 to Ikeda et al., U.S. Pat. No. 5,614,099 to Hirose et al., U.S. Pat. No. 5,755,964 and U.S. Pat. No. 6,878,278 to Mickols, U.S. Pat. No. 5,876,602 to Jons et. al., U.S. Pat. No. 7,279,097 to Tomioka et al.; US 2007/0175820 to Koo et al., US 2007/0039874 to Kniajanski et al., US 2008/0000843 to Sasaki et al. and WO 2007/133362 to Mickols et al. One interesting class of such modifiers includes polyalkylene oxide compounds such as those described in U.S. Pat. No. 6,280,853 to Mickols, US 2007/0251883 to Niu et al. and U.S. Pat. No. 6,913,694 to Koo et al. Such polyalkylene oxide compounds have been combined or reacted with other compounds as described in US 2005/0077243 to Pinnau et al. (see also Pinnau, et al. "Effects of polyether-polyamide block copolymer coating on performance and fouling of reverse osmosis membranes," Journal of Membrane Science 280 (2006) pg. 762-770); US 2007/0175821 to Koo et al., and US 2008/0185332 Niu et al. The entire content of each of the preceding references is incorporated herein by reference.

BRIEF SUMMARY OF THE INVENTION

The invention includes a polyamide membrane, methods for making and using the same, and spiral wound modules including such membranes. The present invention includes many embodiments including methods involving contacting at least a portion of a surface of a polyamide membrane with certain modifiers, including but not limited to combinations of polyalkylene oxide compounds and polyacrylamide compounds. Many additional embodiments are disclosed.

DETAILED DESCRIPTION OF THE INVENTION

The invention is not particularly limited to a specific type, construction or shape of polyamide membrane or application. For example, the present invention is applicable to flat sheet, tubular and hollow fiber polyamide membranes used in a variety of applications including reverse osmosis (RO), nano filtration (NF), ultra filtration (UF), and micro filtration (MF) fluid separations. However, the invention is particularly useful for modifying composite polyamide membranes designed for RO and NF separations such as those previously described in the Background section. An example of a preferred composite membrane is FilmTec Corporation's FT-30™ membrane: a flat sheet membrane comprising a bottom layer (back side) of a nonwoven backing web (e.g. PET scrim), a middle layer of a microporous support having a typically thickness of about 25-125 microns, and top layer (front side) comprising a thin film polyamide layer having a typical thickness less than about 1 micron but more commonly from about 0.01 to 0.1 micron. The microporous support is typically a polymeric material containing pore sizes which are of sufficient size to permit the passage of permeate but not large enough so as to interfere with the bridging over of a thin polyamide membrane formed thereon. For example, the pore size of the support can range from 0.001 to 0.5 micron. Pore diameters larger than 0.5 micron, can, in some instances, permit the polyamide membrane to sag into the pores, thus disrupting the flat sheet configuration desired in some embodiments. Examples of microporous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The microporous support may also be made of other materials.

Due to its relative thinness, the polyamide layer is often described in terms of its coating coverage or "loading" upon the microporous support, e.g. from about 2 to 5000 mg of polyamide per square meter surface area of microporous support, more preferably from about 50 to 500 mg/m$^2$. The polyamide layer is preferably prepared by an interfacial polycondensation reaction between a polyfunctional amine monomer and a polyfunctional acyl halide monomer upon the surface of the microporous support, as described in U.S. Pat. No. 4,277,344 to Cadotte et al and U.S. Pat. No. 6,878,278 to Mickols. More specifically, the polyamide membrane is prepared by interfacially polymerizing a polyfunctional amine monomer with a polyfunctional acyl halide, (wherein each term is intended to refer both to the use of a single species or multiple species), on at least one surface of a microporous support. As used herein, the term "polyamide" refers to a polymer in which amide linkages (—C(O)NH—) occur along the molecular chain. The polyfunctional amine monomer and polyfunctional acyl halide are most commonly delivered to the microporous support by way of a coating step from solution, where the polyfunctional amine monomer is typically coated from an aqueous-based solution and the polyfunctional acyl halide from an organic-based solution. Although the coating steps need not follow a specific order, the polyfunctional amine monomer is preferably coated on the microporous support first followed by the polyfunctional acyl halide. Coating can be accomplished by spraying, film coating, rolling, or through the use of a dip tank among other coating techniques. Excess solution may be removed from the support by air and/or water knife, dryers, ovens and the like.

The polyfunctional amine monomer may have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl)amine). Examples of preferred polyfunctional amine monomers include primary amines having two or three amino groups, for example, m-phenylene diamine, and secondary aliphatic amines having two amino groups such as piperazine. The polyfunctional amine monomer can be applied to the microporous support as an aqueous-based solution. The aqueous solution can contain from about 0.1 to about 20 weight percent and more preferably from about 0.5 to about 6 weight percent polyfunctional amine monomer. Once coated on the microporous support, excess aqueous solution may be optionally removed.

The polyfunctional acyl halide is preferably coated from an organic-based solution including a non-polar solvent. Alternatively, the polyfunctional acyl halide may be delivered from a vapor phase (e.g., for polyfunctional acyl halide species having sufficient vapor pressure). The polyfunctional acyl halide is preferably aromatic and contains at least two and preferably three acyl halide groups per molecule. Because of their lower cost and greater availability, chlorides are generally preferred over other halides such as bromides or iodides. One preferred polyfunctional acyl halide is trimesoyl chloride (TMC). The polyfunctional acyl halide may be dissolved in an non-polar solvent in a range from about 0.01 to 10 weight percent, preferably 0.05 to 3 weight percent, and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which do not pose a threat to the ozone layer and yet are sufficiently safe in terms of their flashpoints and flammability to undergo routine processing without having to undertake extreme precautions. A preferred non-polar solvent is ISOPAR™ available from Exxon Chemical Company. The organic-based solution may also include small quantities of other materials.

Once brought into contact with one another, the polyfunctional acyl halide and the polyfunctional amine monomer react at their surface interface to form a polyamide film or layer which functions as a membrane. In embodiments where the polyamide film is formed on a microporous support, the polyamide membrane is often referred to as a polyamide "discriminating layer" or "thin film layer".

The reaction time of the polyfunctional acyl halide and the polyfunctional amine monomer may be less than one second but contact times typically range from about 1 to 60 seconds, after which excess liquid may optionally be removed, by way of an air knife, water bath(s), dryer, and the like. The removal of the excess water and/or organic solvent can be achieved by drying at elevated temperatures, for example, from about 40° C. to about 120° C., although air drying at ambient temperatures may be used.

Such composite polyamide membranes are commonly used in spiral wound modules for RO and NF separations. Specific examples of commercially available spiral wound modules include: BW30-440i brackish water module, SW30-XLE-400i sea water desalination module, and NF-400 nanofiltration module—all available from FilmTec Corporation.

The subject method generally comprises the step of contacting a polyamide membrane with a "modifier" as will be described below. Unless otherwise stated or otherwise clear from the context, the terms "modifier" and "modifiers" are intended to comprise a combination of a polyalkylene oxide compound and a polyacrylamide compound. It should also be understood that the polyalkylene oxide and polyacrylamide compounds may be combined prior to contact with the polyamide membrane, or may be independently contacted with the polyamide membrane such as by way of sequential coating steps. However, in most preferred embodiments, the polyalkylene oxide and polyacrylamide compounds are combined prior to contacting the polyamide membrane. The subject method may be integrated into the method of making the polyamide membrane, e.g. during the actual formation of the polyamide membrane itself, or practiced after the formation of the polyamide membrane. For example, in one embodiment the subject method is part of a continuous membrane manufacturing process and is implemented just after formation of the polyamide composite membrane; whereas in other embodiments the polyamide membrane may formed and stored prior to treatment by the subject method. The step of "contacting" is intended to broadly describe any means of bringing the modifier into contact with the polyamide membrane. Similarly, the terms "applying" and "coating" are intended to broadly describe a wide variety of means of bringing the modifier into contact with at least a surface portion of the polyamide membrane such as by way of spraying, air knifing, rolling, sponging, coating, dipping, brushing or any other known means. One preferred application technique is to apply a thin coating of the modifier over at least a portion of the outer surface of the polyamide membrane by way of a roll contact coater, sometimes referred to in the art as a "kiss" coater. The modifier is preferably delivered from an aqueous-based solution. The solution may comprise at least 0.001, preferably at least 0.01, and more preferably at least 0.1 weight percent of the modifier; and less than about 10, and more preferably less than about 1 weight percent of the modifier. In another embodiment the coating solution comprises from about 0.01 to 1, but preferably from 0.05 to 0.5 weight percent of the modifier. The coating solution may also include other additional constituents including but not limited to co-solvents, additional modifiers (e.g. polyethylene glycol, polyvinyl alcohol, etc.), along with residual "carry over" from previous manufacturing steps. The modifier coating is disposed upon at least a portion of the surface of the polyamide layer but preferable covers the entire out surface (i.e. the outer surface designed to contact feed fluid).

In an alternative embodiment the modifier may be applied to the polyamide membrane by adding the modifier to a feed fluid which is passed by (in contact with) the membrane, e.g. after the membrane has been assembled into a module.

Once the modifier is contacted with at least a surface portion of the polyamide membrane, the resulting membrane may optionally be heated, such as by way of a convection air dryer or oven; however other heating means may be used, e.g. IR heaters, lamps, etc. While not particularly limited, the temperatures of such dryers or ovens are preferably designed to optimize manufacturing conditions, e.g. line speed, membrane chemistry, etc. In several preferred embodiments, the heating step involves passing the polyamide membrane through an oven or convection air dryer at air temperatures of from about 60 to 120° C., (in some embodiments from about 85 to 100° C.) for a few seconds (e.g. about 1 to 60 seconds) up to several minutes (e.g. 1 to 5 minutes) and even much longer in some embodiments (e.g. 1 to 24 hours). As described below, the optional but preferred step of heating facilitates reaction of the modifier with the polyamide membrane and/or other materials which may be present on the surface of the polyamide membrane.

The steps of "applying" the modifier and/or "heating" may be conducted concurrently but are preferably conducted sequentially. Moreover, the step of applying and/or heating may include multiple cycles, e.g. coating followed by heating followed by subsequent coating and heating. Furthermore, the step of heating may be utilized prior to the step of coating, particularly to remove residual fluids remaining after formation of the polyamide layer.

While a portion of the modifier typically penetrates the surface of the polyamide membrane, the majority of the modifier resides upon the surface upon which it is applied with little or no modifier penetrating through the entire polyamide membrane to its opposite surface. Thus, while the polyamide membrane is "modified", the effect is predominantly a surface phenomena. As a consequence, the applied modifier is referred to herein as a "coating" but those skilled in the art will appreciate that the modifier is not necessarily limited to surface of the polyamide membrane. In most embodiments, the coating is very thin, i.e. less than about 1 micron, and in some embodiments less than 0.1 micron. In many embodiments, the thickness of the coating is between a range of about 0.1 to 0.01 microns. In terms of coverage, the polyamide surface may be coated with the modifier at a loading of from about 1 to 500 and preferably from about 10 to 100 mg of modifier per square meter of polyamide membrane surface.

In one embodiment, the subject modifier comprises a combination of a polyalkylene oxide compound and a polyacrylamide compound which ultimately form a "reaction product" on the polyamide membrane. The term "reaction product" is intended to describe a wide range of associations including: the formation of covalent bonds such as grafting and crosslinking, interactions involving secondary forces such as hydrogen bonding, and/or interactions involving physical entanglement. Nonlimiting examples include: grafted copolymers, polymer blends, polymer alloys and interpenetrating polymer networks (IPN). In one class of embodiments, covalent bonding occurs including grafting and/or crosslinking. For example, in embodiments utilizing polyalkylene oxide compounds having reactive end groups such as epoxides, the epoxides can react (particularly at higher temperatures) with amide groups of the polyacrylamide compound to form grafts. Such grafting reactions can form desirable brush structures. In embodiments utilizing compounds having multiple reactive end groups, crosslinking reactions can occur such as those between polyalkylene oxide compounds and polyacrylamide compounds and/or the polyamide membrane. In yet another class of embodiments, hydrogen bonding occurs between the polyacrylamide compounds and the polyamide surface. In a preferred subclass of embodiments, multiple types of associations occur including both covalent bonding and hydrogen bonding. In preferred embodiments, the "reaction product" remains sufficiently associated with the polyamide membrane so that it remains disposed upon the membrane surface during filtration (e.g. remains analytically detectable after 24 hours of continuous membrane use under standard operating conditions), and even after standard membrane cleaning procedures.

As an additional or alternative binding mechanism, preferred embodiments of the modifiers are also believed to physically entangle with and/or interpenetrate the polyamide material of the membrane, e.g. via long chains of poly(alkylene oxide) and/or polyacrylamide becoming physically entangled with each other and with the polyamide material of the membrane.

While term "polyalkylene oxide compound" and "polyacrylamide compound" are each defined in detail below, it will be understood that each term is intended to refer both to the use of a single species or multiple species.

The term "polyalkylene oxide compound" is intended to describe a class of compounds comprising at least two repeating units comprising an ether-alkyl group wherein the alkyl group forming the backbone of the repeating unit comprises from 2 to 3 carbon atoms which may be unsubstituted or substituted. Common substituents groups include: hydroxyl, carboxylic acid, alkyl, and alkoxy wherein alkyl and alkoxy groups may be unsubstituted or substituted with substituents groups such as hydroxyl and epoxy. Specific examples include ethylene oxide and propylene oxide repeating units. By way of non-limiting illustration, preferred embodiments of polyalkylene oxide compounds can be represented by the repeating unit represented by Formula (I):

Formula (I):

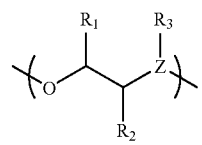

wherein Z is a carbon atom or is not present; and $R_1$ $R_2$ and $R_3$ are not particularly limited but are preferably independently selected from the following: hydrogen; hydroxyl; carboxylic acid; alkyl group (preferably having 1 to 4 carbon atoms but more preferably 1 carbon atom) which may be unsubstituted or substituted with substituents groups such as: hydroxyl or epoxy; and alkoxy (preferably having from 1 to 4 carbon atoms) which may be unsubstituted or substituted with substituents groups such as hydroxyl or epoxy (e.g. ethyl oxide). It should be clear that when Z is not present, $R_3$ is also not present. By way of example, structures (I-A) and (I-B) illustrates an embodiment wherein Z is not present, i.e. the repeating unit only comprises two carbon atoms in the backbone) and $R_3$ is not present.

In preferred embodiments the number of repeating units represented by Formula (I) is from 2 to 20,000, but more preferably from 2 to 50. In several embodiments, the number of repeating units is preferably less than 25 (e.g. 2-24), and more preferably equal to or less than about 21 (e.g. 2-21). For most applications, preferred polyalkylene oxide compounds have a Mw (weight average molecular weight) equal to or less than about 5000 Daltons, but more preferably equal or less than about 1000 Daltons. In still other embodiments, the polyalkylene oxide compound has a Mw from about 100 to 2500 Daltons. In one class of embodiments, $R_1$ is hydrogen. In a preferred subset of embodiments, $R_1$ is hydrogen and $R_2$ and $R_3$ are independently selected from hydrogen or alkyl (substituted or unsubstituted as previously described). Additional representative examples are shown by Formulae (I-A) through (I-D).

Formula (I-A):

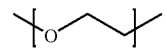

Formula (I-B):

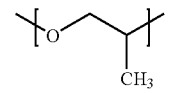

Formula (I-C):

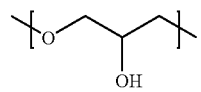

Formula (I-D):

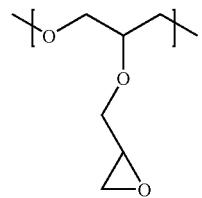

Additional examples of suitable polyalkylene oxide compounds include those described in U.S. Pat. Nos. 6,280,853; 2007/0251883; 2008/0185332; 6,913,694 and 2007/0175821 (each of which is incorporated herein in its entirety). These compounds include the repeating unit of Formula (I) along with a terminal portion or "end group" preferably selected from electrophilic groups reactive with the functional groups present on the surface of the polyamide membrane. Specific examples include groups comprising: acrylates, succinimidyl esters, succinimidyl amides, succinimidylimides, oxycarbonyldimidazoles, azides, epoxides, aldehydes, sulfonates, isocyanates, sulfones (e.g. vinyl sulfone), nitropheyl carbonates, trichlorophenyl carbonates, benzotriazole carbonates, glycidyl ethers, silanes, anhydrides, amines, hydroxyl and thiols. In one set of embodiments, end groups are selected from epoxides and isocyanates.

In addition to the repeating units of Formula (I), the subject polyalkylene oxide compounds may include additional (different type) repeating units (i.e. copolymerized with other type monomers). However, when included, such co-monomers contribute to less than about 10 weight percent, more preferably less than about 5 weight percent, still more preferably less than about 2 weight percent, and in some embodiments less than about 1 weight percent of the subject polyalkylene oxide compound. The subject polyalkylene oxide compounds preferably comprise equal to or more than about 50 weight percent, more preferably equal to or more than about 90 weight percent, still more preferably equal to or more than about 95 weight percent, more preferably equal to or more than about 98 weight percent and in some embodiments equal to or more than 99 weight percent of the repeating units represented by Formula (I).

The polyalkylene oxide compound may be linear, branched, comb, brush, star or dendritic. Specific examples of preferred species include: poly(ethylene oxide) diglycidyl ether (PEGDE), and polyglycerin-polyglycidylether compounds such as DENACOL 512 available from Nagase Chemtex Corp. Further examples of branched polyalkylene oxide compounds are provided in US 2007/0251883 which is incorporated herein by reference.

The polyalkylene oxide compounds are preferably water soluble, i.e. soluble at concentrations of at least about 0.1 wt %, preferably at least about 1 wt %, at 25° C. and 1 atm.

The term "polyacrylamide compound" is intended to describe a class of compounds comprising at least two repeating units represented by Formula (II):

Formula (II):

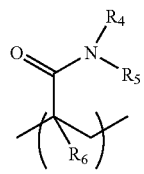

wherein $R_6$ is selected from hydrogen and alkyl; and $R_4$ and $R_5$ are independently selected from the following groups: hydrogen, alkyl, alicyclic, aryl, heterocyclic; or $R_4$ and $R_5$ may collectively form a heterocyclic ring. With the exception of hydrogen, each of preceding groups may be unsubstituted or substituted. Representative substituents groups include: an alkyl having from 1 to 2 carbon atoms, hydroxyl (—OH), thiol (—SH), amine (—NH$_2$), guanidine and amidine. Representative heterocyclic groups include but not limited to: pyridine, piperidine, piperazine, imidazole and pyrrolidine. Representative alicyclic groups include cyclopentene and cyclohexane. Representative alkyl groups include those having from 1 to 4 carbon atoms (e.g. methyl, ethyl, propyl, isopropyl, butyl). In one set of embodiments, $R_6$ is selected from hydrogen and methyl, and $R_4$ and $R_5$ are independently selected from hydrogen, and an alkyl having from 1 to 4 carbon atoms which may be unsubstituted or substituted with one or more of the following substituents groups: hydroxyl (—OH), thiol (—SH), amine (—NH$_2$), guanidine and amidine. By way of further illustration, the structural formula of a few representative polyacrylamide compounds are provided by Formula (II-A) through (II-F).

Formula (II-A):

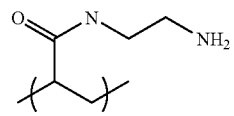

Formula (II-B):

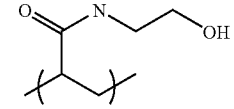

Formula (II-C):

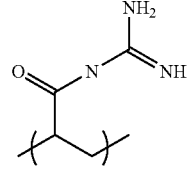

Formula (II-D):

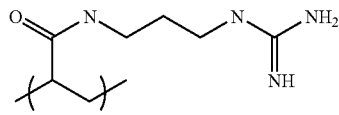

Formula (II-E):

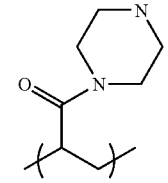

Formula (II-F):

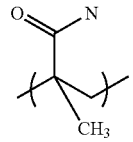

Preferred species of the subject polyacrylamide compounds include those comprising from 4 to 50,000, and more preferably from 100 to 12,000 of the repeating units represented by Formula (II). Further examples of species polyacrylamide compounds include those having weight average molecular weights (Mw) of from about 1,000 to 15,000,000 Daltons, including those having Mw from about 10,000 to 5,000,000. In some embodiments it may be beneficial to combine different species of polyacrylamide compounds. For example, in order to optimize the viscosity of a coating solution, combinations of different molecular weight species may be used, e.g. 10,000 and 3,000,000 Daltons.

In addition to the repeating units of Formula (II), the subject polyacrylamide compounds may include additional (different type) repeating units (i.e. copolymerized with other type monomers). By way of non-limiting representative example, repeating units such as acrylic acid, alkylene oxide as previously described in connection with Formula (I), and ethylene amine may be included. However, when included, such co-monomers typically contribute to less than about 50 weight percent, more preferably less than about 20 weight percent, more preferably less than about 5 weight percent, still more preferably less than about 2 weight percent, and in some embodiments less than about 1 weight percent of the subject modifier polymer. The subject polymer comprises equal to or more than about 50 weight percent, preferably equal to or more than about 90 weight percent, still more preferably equal to or more than about 95 weight percent, more preferably equal to or more than about 98 weight percent, and in some embodiments equal to or more than about 99 weight percent of the repeating units represented by Formula (II).

The polyacrylamide compounds are preferably water soluble, i.e. soluble at concentrations of at least about 0.1 wt %, preferably at least about 1 wt %, at 25° C. and 1 atm.

Suitable polyacrylamide compounds may be prepared by those skilled in the art using conventional methodologies, or commercially obtained from such sources as the Sigma-Aldrich Company and Polyscience, a division of Preston Industries, Inc. Specific examples of commercially available compounds from the Sigma Aldrich Company include: polyacrylamide (Mw=10,000) (Catalog no. 434949); poly-N-isopropyl acrylamide (Mn 20,000-25000) (Catalog no. 535311); poly(acrylamide-co-acrylic acid)/80% polyacrylamide (Mw 520,000) (Catalog no. 511471) and poly(acrylamide-co-acrylic acid)/20% polyacrylamide (Mw 200,000 ) (Catalog no. 511463).

The polyalkylene oxide and polyacrylamide compounds along with other optional additives may be combined and subsequently coated upon the polyamide membrane from a common aqueous-based solution, or the compounds may be sequentially coated. Additional or alternative solvents and additives may also be included in the coating solution(s). The coating solution preferably comprises at least 0.001, preferably at least 0.01, and more preferably at least 0.1 weight percent of the subject modifier (i.e. combination of both the polyalkylene oxide compound and polyacrylamide compound), and less than about 10 and more preferably less than about 1 weight percent of the modifier. The coating solution is preferably derived from a mixture comprising a polyalkylene oxide compound and a polyacrylamide compound in a weight ratio of from about 5:1 to about 1:5, preferably from about 4:1 to about 1:4, more preferably from about 3:1 to about 1:3 and still more preferably from about 2:1 to about 1:2. The term "aqueous-based solution" is intended to describe solutions wherein water is the majority solvent (by weight). In some embodiments, water comprises more than 50 wt % of the total solution. In other embodiments, water comprises at least 90 wt %, and in some embodiments at least 95 wt % and in others at least 99 wt % based upon the total weight of the solution. The coating preferably covers at least 90% of the total surface of the polyamide membrane at a loading of from about 1 to 200 mg of modifier per square meter of polyamide membrane surface. Preferably, the coating operation results in a loading of modifier from about 2 to 50 and more preferably from about 10 to 20 mg/m². In most embodiments, the coating is very thin, i.e. less than about 1 micron, preferably less than or equal to 0.1 micron, and preferably between about 0.1 to 0.01 micron. Once coated, the polyamide membranes are preferably heated at a temperature of from about 60 to about 120° C. for about 1 to 60 seconds. The heating step may be performed by passing the coated membrane through a heated air dryer as part of a continuous operation.

The polyamide membranes of the subject invention may also include hygroscopic polymers upon at least a portion of its surface. Such polymers include polymeric surfactants, polyvinyl alcohol and polyacrylic acid. In some embodiments, such polymers may be blended and/or reacted with the subject modifiers, and may be coated or otherwise applied to the polyamide membrane from a common solution, or applied sequentially.

In preferred embodiments, the subject modifier becomes chemically bound to the polyamide membrane. For example, in embodiments were the polyalkylene oxide compound includes reactive end groups, such as a hydroxyl, epoxide, isocyanates, azides, or sulfonates, such groups are believed to form covalent bonds with unreacted amines and/or carboxylic acids groups of the polyamide membrane. Moreover, the polyacrylamide compound is believed to form strong hydrogen bonding with the polyamide membrane surface. The optional step of heating the polyamide membrane after being coated with the subject modifier is believed to further facilitate reaction between the individual components, e.g. covalent bonding of the polyalkylene oxide compound with both the polyacrylamide compound and polyamide membrane. Such heating is also believed to remove residual water and lead to hydrogen bonding between the modifier and the polyamide membrane. By way of simple illustration, a proposed reaction product is represented by Formula (III)—showing a polyacrylamide compound and polyalkylene oxide compound covalently bonded through an amide linkage (such as by reaction between an epoxy end group of the polyalkylene oxide compound with an amide group of the polyacrylamide compound) and wherein the polyalkylene oxide compound is also covalently bonded to the surface of the polyamide membrane (such as by way of reaction between a reactive epoxy end group of the polyalkylene oxide compound with an amine and/or carboxylic acid group of the polyamide membrane).

Formula (III):

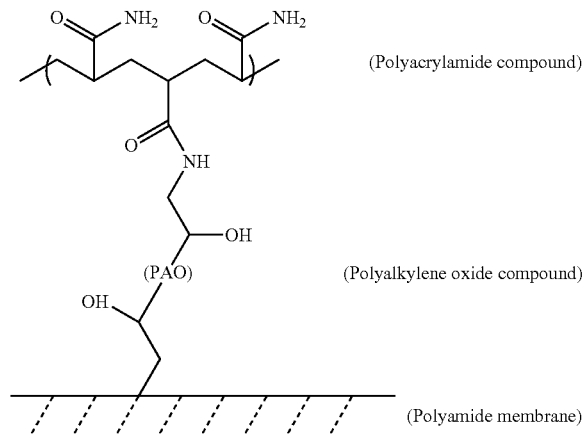

"PAO" refers to a repeating alkylene oxide unit.

The simplified reaction product of Formula (III) is provided by way of example only. Many other species of polyalkylene oxide compounds and polyacrylamide compounds may be used. Moreover, the resulting coating preferably includes a much more complex structure which may include multiple crosslinks between multiple polyacrylamide compounds and polyalkylene oxide compounds, along with hydrogen bonding and polymer chain entanglement and penetration of the polyamide membrane surface. While not shown, it will be appreciated by those skilled in the art that pendant amide groups may also hydrolyze under reaction conditions or during use resulting in the formation of acrylic acid groups.

In a preferred embodiment the polyalkylene oxide and polyacrylamide compounds are combined and/or stored in a manner that does not result in substantial reaction (e.g. crosslinking or hydrolysis) prior to the step of coating upon the polyamide membrane. Such reaction can be avoided by optimizing the timing between the preparation of the coating mixture and the step of coating. Other variables such as storage temperature, selection of species of polyalkylene oxide and polyacrylamides including molecular weight, ratios and concentrations may also be optimize through routine experimentation.

In an alternative embodiment, the polyalkylene oxide and polyacrylamide compounds are reacted prior to the step of coating upon the polyamide membrane. Non-limiting examples of preferred reaction products include branched, comb and brush type structures, e.g. a polyacrylamide backbone with polyalkylene oxide pendant side chains.

EXAMPLES

Experimental composite polyamide membranes were prepared on a pilot scale coating system by coating a microporous polysulfone support (including non-woven fabric backing) with an aqueous solution of m-phenylenediamine (MPD) (MPD concentration of approximately 3.0 wt %). The resulting support was then drained to remove the excess aqueous solution and subsequently coated with a solution of trimesoyl chloride (TMC) in ISOPAR™ L (Exxon Corp.) (TMC concentration of approximately 0.1 wt/vol %) to produce a "thin film" polyamide layer upon the microporous support. After formation of the polyamide layer, the composite polyamide membranes were passed through a water bath at room temperature followed by a subsequent water bath containing 3.5 wt % glycerin at approximately 100° C. The membranes were then passed through a convection air dryer at approximately 93° C. for approximately 24 seconds followed by coating via a contact coater with one of the aqueous-based coating solutions described below. Once coated, the polyamide membranes were passed through a second convection air dryer at approximately 93° C. for approximately 24 seconds. The membranes were then tested using an aqueous test solution comprising: approximately 2,000 ppm NaCl, 5 ppm boric acid, 100 ppm sodium nitrate, 100 ppm isopropyl alcohol (IPA), maintained at an approximate pH of 8 at a transmembrane pressure of 225 psi (approx. 1.55 MPascals). Flux (rate of permeate transported per unit of membrane area) and solute passage (percent of a constituent passing thru the membrane) values were measured for each membrane (3 sample coupons of each membrane) and are reported below.

The coating solutions comprised several different concentrations (0.025 wt %; 0.075 wt %; and 0.1 wt %) of three different modifier formulations:

1) Poly(ethylene glycol) diglycidyl ether (PEGDE) having a Mn of 526, obtained from Sigma-Aldrich Company (Catalog no. 475696; CAS Number: 72207-80-8).
2) Polyacrylamide (PAM) having a Mw of 10,000, obtained from Sigma-Aldrich Company (Catalog no. 434949).
3) Combination of PEGDE and PAM provided in a 1:1 wt. ratio.

TABLE I

| Total Concentration (wt %) of modifier in coating solution | | | Flux (gfd) | Solute Passage (%) | | | | |
|---|---|---|---|---|---|---|---|---|
| | | | | NaCl | Boric acid | Silica | Nitrate | IPA |
| 0.025 | PAM (no PEGDE) | Avg. | 36.3 | 0.69 | 25.56 | 0.44 | 4.70 | 7.81 |
| | | Std Dev | 2.5 | 0.07 | 1.43 | 0.03 | 1.14 | 1.28 |
| | PAM/PEGDE (1:1 ratio) | Avg. | 34.4 | 0.54 | 23.02 | 0.32 | 2.74 | 6.23 |
| | | Std Dev | 1.0 | 0.02 | 1.23 | 0.01 | 0.32 | 0.98 |
| | PEGDE (no PAM) | Avg. | 33.4 | 0.53 | 24.23 | 0.35 | 3.47 | 6.48 |
| | | Std Dev | 0.6 | 0.04 | 1.17 | 0.01 | 0.46 | 1.04 |
| 0.075 | PAM (no PEGDE) | Avg. | 37.0 | 0.68 | 25.35 | 0.43 | 4.54 | 5.75 |
| | | Std Dev | 1.4 | 0.04 | 0.55 | 0.05 | 0.64 | 1.10 |
| | PAM/PEGDE (1:1 ratio) | Avg. | 28.4 | 0.47 | 22.42 | 0.33 | 2.51 | 5.48 |
| | | Std Dev | 1.2 | 0.04 | 0.61 | 0.05 | 0.23 | 0.93 |
| | PEGDE (no PAM) | Avg. | 28.4 | 0.50 | 23.82 | 0.35 | 2.98 | 6.13 |
| | | Std Dev | 1.7 | 0.03 | 0.71 | 0.03 | 0.55 | 1.30 |
| 0.100 | PAM (no PEGDE) | Avg. | 37.5 | 0.64 | 24.48 | 0.41 | 3.70 | 6.18 |
| | | Std Dev | 1.0 | 0.03 | 0.87 | 0.03 | 0.13 | 0.55 |
| | PAM/PEGDE (1:1 ratio) | Avg. | 28.4 | 0.43 | 22.06 | 0.30 | 2.45 | 5.89 |
| | | Std Dev | 1.1 | 0.01 | 1.00 | 0.03 | 0.15 | 1.66 |
| | PEGDE (no PAM) | Avg. | 26.6 | 0.45 | 23.21 | 0.32 | 1.89 | 7.53 |
| | | Std Dev | 0.3 | 0.03 | 0.71 | 0.05 | 1.63 | 1.44 |

Uncoated polyamide membranes (controls) were also prepared and tested according to the same methodology; the results of which are provided in Table II.

TABLE II

| Controls - no "modifier" coated on membrane | | Flux (gfd) | Solute Passage (%) | | | | |
|---|---|---|---|---|---|---|---|
| | | | NaCl | Boric acid | Silica | Nitrate | IPA |
| Control 1 | Average | 37.9 | 0.61 | 24.64 | 0.37 | 4.47 | 6.73 |
| | Std Dev | 0.6 | 0.05 | 0.68 | 0.03 | 0.56 | 0.97 |
| Control 2 | Average | 35.2 | 0.61 | 25.93 | 0.39 | 4.29 | 7.80 |
| | Std Dev | 0.5 | 0.01 | 0.78 | 0.03 | 0.69 | 0.38 |

As demonstrated by the experimental data provided above, polyamide membranes coated with a combination of poly(ethylene oxide) diglycidyl ether and polyacrylamide had generally lower solute passage values as compared with polyamide membranes coated with either individual component.

In addition to other features, preferred embodiments of the invention also exhibit improved storage stability. Composite polyamide membranes are commonly assembled and stored in a dry state. Upon re-wetting, such membranes often have noticeable changes in flux and solute passage. Preferred embodiments of the subject polyamide membranes do not exhibit such deleterious changes.

While not limited to a particular type of polyamide membrane, the subject invention is particularly suited for application to composite polyamide membranes such as those commonly used in RO and NF applications. Such membranes include a microporous support and a thin film polyamide layer which can be coated with the subject modifier(s). For example, polyamide chemistries are typically optimized for specific applications such as RO desalination, RO brackish water, and NF applications. While such membranes may be based upon FT-30 type chemistries (e.g. MPD & TMC interfacial polymerization), the amounts and ratios of constituents typically varies in order to optimize performance for a particular application. Moreover, additives (as described in U.S. Pat. No. 6,878,278) are often utilized to further optimize or customize performance of the underlying polyamide membrane for a specific application. While the specific chemistry involved in the formation of the polyamide membrane will impact final membrane performance, (e.g. flux, solute passage, etc.), the described examples are intended to demonstrate relative improvement resulting from the subject coating which is largely independent of the underlying polyamide chemistry.

While principles of the invention are amenable to various modifications and alternatives forms, particular species have been described by way of examples and detailed description. It should be understood that the intent of this description is not to limit the invention to the particular embodiments described, but rather to cover all modifications, equivalents, and alternatives falling within the spirit and scope of the disclosure. Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The invention claimed is:

1. A composite membrane comprising a microporous support, a thin film polyamide layer and a coating located upon a surface portion of the thin film polyamide layer, wherein the coating comprises a reaction product of a polyalkylene oxide compound and a polyacrylamide compound.

2. The membrane of claim 1 wherein the reaction product is derived from a combination comprising a polyalkylene oxide compound and a polyacrylamide compound in a weight ratio of from about 5:1 to about 1:5.

3. The membrane of claim 1 wherein the coating has a thickness of from about 0.01 to 0.1 micron.

4. The membrane of claim 1 wherein the polyalkylene oxide compound comprises a repeating unit represented by Formula (I):

Formula (I):

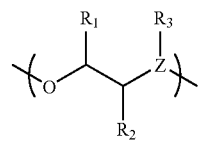

wherein Z is a carbon atom or not present; $R_1$, $R_2$ and $R_3$ are independently selected from: hydrogen, hydroxyl, carboxylic acid, alkyl and alkoxy: Wherein alkyl and alkoxy may be substituted or unsubstituted.

5. The membrane of claim 4 wherein the polyalkylene oxide compound has a weight average molecule weight (Mw) of from about 100 to 2500 Daltons.

6. The membrane of claim 1 wherein the polyacrylamide compound comprises a repeating unit represented by Formula (II):

Formula (II):

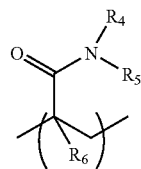

wherein $R_6$ is selected from hydrogen and alkyl which may be substituted or unsubstituted; and $R_4$ and $R_5$ are independently selected from: alkyl, alicyclic, aryl, heterocyclic; each of which may be substituted or unsubstituted, or hydrogen; or $R_4$ and $R_5$ may collectively form a heterocyclic ring which may be substituted or unsubstituted.

7. The membrane of claim 6 wherein the polyacrylamide compound has a weight average molecule weight (Mw) of from about 1000 to 15,000,000.

8. A method of modifying a polyamide membrane comprising the step of contacting at least a portion of a surface of a polyamide membrane with a polyalkylene oxide compound and a polyacrylamide compound.

9. The method of claim 8 comprising the step of coating at least a portion of a surface of the polyamide membrane with a solution comprising a combination of a polyalkylene oxide compound and a polyacrylamide compound.

10. The method of claim 9 wherein the solution is an aqueous-based solution.

11. The method of claim 9 comprising the step of heating the polyamide membrane after the step of coating at least a portion of a surface of the polyamide membrane with a solution comprising a combination of a polyalkylene oxide compound and a polyacrylamide compound.

12. The method of claim 8 comprising the step of coating at least a portion of a surface of a polyamide membrane with an aqueous-based solution comprising a combination of a polyalkylene oxide compound and a polyacrylamide compound in a weight ratio of from about 1:5 to 5:1, followed by step of heating the polyamide membrane at a temperature of from about 60° C. to 120° C.

13. The method of claim 8 comprising the steps of coating at least a portion of a surface of a polyamide membrane with a solution comprising a polyalkylene oxide compound and a solution comprising polyacrylamide compound, wherein the coating steps are followed by the step of heating the polyamide membrane.

14. The method of claim 8 wherein the membrane comprises a composite membrane comprising a microporous support and a thin film polyamide layer and wherein the step of coating comprises contacting at least a portion of a surface of the thin film polyamide layer with a polyalkylene oxide compound and a polyacrylamide compound.

15. The composite membrane of claim 1 wherein the membrane is a reverse osmosis or nano filtration membrane.

16. The composite membrane of claim 1 wherein the thin film polyamide layer has a thickness of less than 1 micron.

17. The membrane of claim 6 wherein $R_4$, $R_5$ and $R_6$ are independently selected from: hydrogen and alkyl having 1 to 4 carbon atoms.

18. The membrane of claim 6 wherein the polyacrylamide compound comprises a co-polymer comprising at least 50 weight percent of the repeating unit of Formula (II).

19. The method of claim 8 wherein the polyalkylene oxide compound comprises a repeating unit represented by Formula (I):

Formula (I):

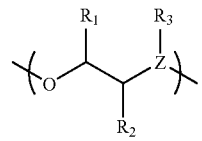

wherein Z is a carbon atom or not present; $R_1$, $R_2$ and $R_3$ are independently selected from: hydrogen, hydroxyl, carboxylic acid, alkyl and alkoxy; wherein alkyl and alkoxy may be substituted or unsubstituted; and the polyacrylamide compound comprises a repeating unit represented by Formula (II):

Formula (II):

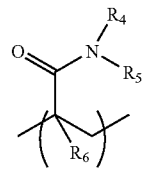

wherein $R_6$ is selected from hydrogen and alkyl which may be substituted or unsubstituted; and $R_4$ and $R_5$ are independently selected from: alkyl, alicyclic, aryl, heterocyclic each of which may be substituted or unsubstituted, or hydrogen; or $R_4$ and $R_5$ may collectively form a heterocyclic ring which may be substituted or unsubstituted.

* * * * *